United States Patent [19]

Frisque

[11] 4,025,712

[45] May 24, 1977

[54] METHOD FOR ENHANCING THE SOLUBILITY OF DRIED LATEX POLYMER

[75] Inventor: Alvin J. Frisque, Western Springs, Ill.

[73] Assignee: Nalco Chemical Company, Oak Brook, Ill.

[22] Filed: July 30, 1976

[21] Appl. No.: 710,761

Related U.S. Application Data

[63] Continuation of Ser. No. 561,736, March 24, 1975, abandoned.

[52] U.S. Cl. .................... 528/488; 260/29.6 H; 260/79.3 MU; 528/492
[51] Int. Cl.² ........................................... C08F 6/22
[58] Field of Search ........... 260/79.3 MU; 528/488, 528/492

[56] References Cited

UNITED STATES PATENTS

| | | | |
|---|---|---|---|
| 3,058,958 | 10/1962 | Glavis | 260/80.3 |
| 3,284,393 | 11/1966 | Vanderhoff et al. | 260/29.6 |
| 3,624,019 | 11/1971 | Anderson et al. | 260/29.6 H |
| 3,706,722 | 12/1972 | Nelson et al. | 260/85.5 ZA |
| 3,732,193 | 5/1973 | Suarz | 260/79.3 MU |

*Primary Examiner*—Stanford M. Levin
*Attorney, Agent, or Firm*—John G. Premo; Robert A. Miller; Barry W. Sufrin

[57] ABSTRACT

A method for enhancing the solubility of substantially dry polymers and copolymers of water-soluble ethylenic-unsaturated monomers.

5 Claims, No Drawings

METHOD FOR ENHANCING THE SOLUBILITY OF DRIED LATEX POLYMER

This is a continuation of application Ser. No. 561,736 filed on Mar. 24, 1975, now abandoned.

It is now known that water-soluble ethylenic-unsaturated monomers may be polymerized by a water-in-oil emulsion polymerization process to produce polymeric latices. These latices may be characterized as being water-in-oil emulsions which contain dispersed therein a finely-divided water-soluble vinyl addition polymer.

Latices of the type referred to above and their method of manufacture are described in U.S. Pat. No. 3,284,393. The polymeric latices produced by the polymerization method set forth in U.S. Pat. No. 3,284,393 are unstable under long term storage conditions. At room temperature, the polymeric latices tend to precipitate the polymer therefrom over a period of time ranging between a few hours up to several days. Due to the instability of these latices, the polymers formed are generally removed from the water-in-oil emulsion in which they are contained by precipitation or sedimentation techniques to produce a dry form polymer.

However, these dry polymers have been found to have several serious disadvantages. First, when precipitated, the polymer particles tend to coalesce to form large chunks of polymer which must then be dried. The drying step must be performed at a temperature sufficient to dry not only the outer surface of the polymer chunks, but also the inner portions. Thus, drying the precipitated polymer oftentimes involves the utilization of excessively high temperatures and long drying periods.

After the drying step has been completed, it is necessary to grind the polymer mass into a powder which is suitable for dissolution in water. Generally, the polymer mass is ground into a particle size of from 10 to 40 mesh. Fines tend to escape during the grounding operation and thereafter resulting in product loss and air pollution.

Finally, products made by this procedure are often quite difficult to dissolve. It has been found that a polymer product made by the patented process referred to above takes from 1 to 8 hours to dissolve in aqueous solution. Under conditions involving the addition of dry polymer to a vessel containing 100 gallons of water with mixing at a speed of 2000 rpm, 1 to 2 hours have been required for complete dissolution.

Several of the above described problems associated with the production of dry polymer from a water-in-oil emulsion have been circumvented or eliminated by a newly discovered means of preparation. This new means of preparation, described in U.S. Pat. Application Ser. No. 305,206* now abandoned, and hereby incorporated by reference, provides: (a) a method for making substantially dry polymers and copolymers of water-soluble ethylenic-unsaturated monomers; (b) a method for making substantially dry polymers and copolymers in which the drying step can be simplified and shortened; (c) a method for making substantially dry polymers and copolymers of water-soluble ethylenic-unsaturated monomers in which dusting may be avoided; and (d) a method for making substantially dry polymers and copolymers of water-soluble ethylenic-unsaturated monomers which have a fast rate of dissolution in water.

*Filed on November 9, 1972 for "Method for the Preparation of Dried Latex Polymer".

Unfortunately, when producing dry polymer as per the above referenced method, it has been found that occassionally the expected enhancement of solubility is seriously reduced or lost. It is believed that this problem arises from the adherence of emulsifying agent to the dried polymer particles.

It is, therefore, an object of this invention to obviate the problem of reduced solubility. It is a further object of this invention to generally improve the solubility of dried polymer produced according to the method of U.S. Pat. Application Ser. No. 305,206.

THE INVENTION

Polymers and copolymers of water-soluble ethylenic-unsaturated monomers prepared by the method of U.S. Pat. Application Ser. No. 305,206 may be produced by:

A. Preparing a water-in-oil emulsion which employs an alkaline sensitive emulsifying agent and which contains dispersed therein a finely-divided water-soluble vinyl addition polymer;

B. Contacting the emulsion of step (A) with water which contains dispersed therein from 0.1 to 10.0% by weight based on polymer of a water-soluble surfactant to provide a partially inverted emulsion;

C. Casting the partially inverted emulsion of step (B) upon a surface to form a thin film;

D. Heating the film of the partially inverted emulsion to provide a dry film polymer product; and E. Recovering the dry film product.

The improvement of the present invention requires the additional step of adjusting the pH of the partially inverted emulsion of step (B) to at least 11.5, and preferably at least 13.0, with a water-soluble base prior to forming the thin film of step (C).

The water-in-oil emulsion referred to above, which contains dispersed therein a finely-divided water-soluble vinyl addition polymer, may be prepared according to the disclosure in U.S. Pat. No. 3,624,019 and a patent application Ser. No. 161,967, abandoned. This process involves the formation of an emulsion by the addition of a monomer phase to an oil phase containing an emulsifying agent. The monomer phase is comprised of a water-soluble ethylenic-unsaturated monomer in an aqueous solution. The monomer phase concentration may range from 30 to 70% by weight of the emulsion. The oil phase is any inert hydrophobic liquid such as a hydrocarbon or substituted hydrocarbon. The inert hydrophobic liquid concentration ranges from 5 to 40% by weight of the emulsion. Any emulsifying agent which is oil soluble is acceptable.

All known polymerizable water-soluble ethylenic-unsaturated monomers, the polymers of which are insoluble in the continuous oil phase, can be polymerized by a water-in-oil emulsion polymerization process to give a polymeric latex. Such monomers have a water solubility of at least 5 weight percent and include acrylamide, methacrylamide, acrylic acid, methacrylic acid, vinylbenzyl dimethylammonium chloride, alkali metal and ammonium salts of a 2-sulfoethylacrylate, sodium styrene sulfonate, 2-aminoethylmethacrylate hydrochloride, alkali metal and ammonium salts of vinylbenzyl sulfonates and the like. When aqueous solutions of the monomers are used, they can be varied widely in monomer content. Proportions between 70 and 30% by weight monomer correspondingly to 30 to 70% water are used, depending upon the monomer and the temperature of polymerization. The ratio of monomer phase to oil phase is also widely variable, but is preferably between 30 and 70 parts of the former to between 70 and 30 parts of the latter by weight. A monomer phase to oil phase ratio of about 70 to 30 is most preferred.

In order to emulsify the monomer phase into the oil phase to give a water-in-oil emulsion, an emulsifying agent of the water-in-oil type is used in an amount ranging between 0.1 and 10% by weight of the oil phase. The emulsifying agent should be alkaline sensitive and preferably should undergo a shift in its hydrophilelipophile balance towards decreased hydrophobicity and hence greater water-solubility upon adjustment of the pH of the emulsion to about pH 11.5 or higher. Such an emulsifying agent, if subjected to the improvement of the present invention as described above, will not interfere with the dissolution of the dried polymer. Furthermore, it can be expected that the alkaline-treated emulsifying agent will significantly contribute to the desired inversion of the water-in-oil emulsion thus reducing the volume of surfactant required for this task. The preferred emulsifying agents are esters which undergo alkaline hydrolysis. Any conventional alkaline sensitive water-in-oil emulsifying agent can be used, such as sorbitan monooleate or sorbitan monostearate and the like.

The oil phase can be any inert hydrophobic liquid which can readily be separated from the disperse phase polymeric product.

A preferred group of hydrophobic liquids are the hydrocarbon liquids which include both aromatic and aliphatic compounds. Thus, such organic hydrocarbon liquids as benzene, xylene, toluene, mineral oils, kerosenes, napthas and, in certain instances, petrolatums may be used. A particularly useful oil from the standpoint of its physical and chemical properties is the branched-chain isoparaffinic solvent sold by Humble Oil and Refining Company under the Tradename "ISOPAR M." Typical specifications of this narrow-cut isoparaffinic solvent are set forth below in Table I:

TABLE I

| Specification Properties | Minimum | Maximum | Test Method |
|---|---|---|---|
| Gravity, API at 60/60° F. | 48.0 | 51.0 | ASTM D 287 |
| Color, Saybolt | 30 | — | ASTM D 156 |
| Aniline point, ° F. | 185 | — | ASTM D 611 |
| Sulfur, ppm | — | 10 | ASTM D 1266 (Nephelometric mod.) |
| Distillation, ° F. | | | ASTM D 86 |
| IBP | 400 | 410 | |
| Dry Point | — | 495 | |
| Flash point, ° F. (Pensky-Martens closed cup) | 160 | — | ASTM D 93 |

Free radical yielding initiators useful in polymerizing ethylenic-unsaturated monomers, such as benzoyl peroxide, lauroyl peroxide, 2,2' azobis (isobutyronitrile), potassium persulfate and the like are used in the polymerization, preferably in amounts ranging between 0.02 and 1.0% by weight of the oil or monomer phase, depending upon the solubility of the initiator. Polymerization can also be carried out using high energy irradiation, high energy electrons from a Van de Graaff accelerator, etc., or ultraviolet irradiation.

Elevated reaction temperatures, preferably between 40° and 70° C., are used with free radical yielding initiators. Within such a temperature range, conversion is substantially complete in from one-half hour to several days, depending upon monomer and reaction variables.

High energy or ultraviolet irradiation polymerization is carried out at room temperature, above room temperature, or below room temperature, as desired.

The process described above may be briefly summarized by the following series of steps:

A. forming a water-in-oil emulsion from:
1. water which contains dissolved therein a water-soluble ethylenic-unsaturated monomer, thereby producing a monomer phase which has a concentration of from 30 to 70% by weight of said emulsion;
2. an inert hydrophobic liquid;
3. a water-in-oil emulsifying agent in a concentration of from 0.1 to 10% by weight;
4. a free radical initiator;

B. heating said emulsion under free radical forming conditions to polymerize the water-soluble ethylenic-unsaturated monomer contained in the emulsion; and C. polymerizing said monomer in the water-in-oil emulsion to produce a polymeric latex.

As indicated, this process produces a polymeric latex which comprises a water-in-oil emulsion containing dispersed therein a finely-divided water-soluble vinyl addition polymer.

The final water-in-oil emulsion composition consists of:

A. an aqueous phase ranging between 75 and 95% by weight of the emulsion which is comprised of:
1. a water-soluble addition polymer having a concentration between 20 and 50% by weight of the emulsion;
2. water ranging between 5 and 25% by weight of the aqueous phase;

B. a hydrophobic liquid ranging between 10 and 65% by weight of the emulsion; and C. a water-in-oil emulsifying agent having a concentration between 0.1 and 30% by weight of the emulsion.

The emulsion containing polymer is then contacted with water which contains dispersed therein 0.1 to 10.0% by weight based on polymer of a water-soluble surfactant to provide a partially inverted emulsion. Preferably the water contains 0.1 to 5.0% surfactant, based on polymer. It is desired to add enough water to reduce the solids level of the emulsion to 15 to 25%, preferably 20% by weight. This involves the addition of 30 to 40% by weight of water, based on total emulsion.

The improvement of the present invention requires the use of an alkaline sensitive emulsifying agent as discussed above and the presence of base sufficient to bring the pH of the emulsion-water-surfactant mixture to at least pH 11.5 and preferably at least pH 13. The base may be added to the surfactant-water mixture prior to contacting the water-in-oil emulsion, or it may be added directly to the water-in-oil emulsion prior to the surfactant treatment.

The method for dissolution of a polymeric latex is taught in U.S. Pat. No. 3,624,019. Step (B) of the present invention, however, involves only a partial inversion. The contact time is merely for 0.5 to 10.0 seconds, preferably less than one second. It is not desirable to completely dissolve the polymer in water. This short contact time before the drying step may be effected by various techniques. One particularly efficient method is a Kenics Static Mixer in which the two streams are contacted with good mixing for periods of time as short as one second.

The preferred surfactants are hydrophilic and are further characterized as being water-soluble. Any hydrophilic-type surfactant such as ethoxylated octyl phenols, ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride and stearyl amine hydrobromide.

Any anionic, cationic or nonionic compound can be used as the surfactant.

Any base capable of bringing the mixture to the required pH may be used. For example, alkali metal hydroxides or quaternary ammonium hydroxides may be used. A typical quaternary ammonium hydroxide is tetra methyl ammonium hydroxide. Typical alkali metal hydroxides include lithium, sodium and potassium hydroxides.

In the practice of the improvement which comprises this invention, the base used should be added as an aqueous solution slowly and with mixing. The preferred base used is an alkali metal hydroxide, and more specifically, a sodium, potassium or lithium hydroxide with the most preferred being about a 50% aqueous solution of the hydroxide. Though the pH of the emulsion-water-surfactant mixture should be at least pH 11.5 and preferably pH 13, the optimal alkalinity will depend upon the nature of the polymer, the emulsifying agent, the oil and the surfactant used.

The preferred method of drying is by casting the polymeric latex upon a heated surface to form a thin film. It must be recognized that the drying variables, such as drying temperature, film thickness and drying time are all interrelated and as a result, each is dependent upon the other. Therefore, it is necessary to determine for each individual polymeric system the optimum drying variables to produce a dry, active product.

The amount of heat needed to dry a particular polymeric latex will depend upon several variables such as the solvents used, the solvent concentration and the ratio of water-to-oil. Generally, a temperature within the range of 150° to 400° F. is adequate.

The most preferred method of drying the polymeric latex is by casting the polymeric latex upon a drum dryer. The rotating drum can be heated by either steam or electrical means. The polymeric latex is continuously cast upon the heated surface of the drum, dried and removed from the drum surface as a dry product. The dried polymer latex is characterized as having finely-divided discrete, substantially spherical particles having an average particle size range between 0.5 and 5.0 microns.

EXAMPLES

1. A water-in-oil emulsion composed of about 29% acrylamide polymer, 30% Isopar M, 40% water and about 1% of sorbitan monooleate as an emulsifying agent was partially inverted and dried according to the method of U.S. Pat. Application Ser. No. 305,206, as described above, using a drum dryer. Samples of the dry polymer were then dissolved to form a solution of 0.5% polymer by weight. All samples required 8 or more hours to dissolve.

2. Varying amounts of 50% by weight aqueous NaOH were added to the water-surfactant mixture of the method of U.S. Pat. Application Ser. No. 305,206, which is discussed in part above. Samples of the emulsion were then contacted with the surfactant mixture and the partially inverted emulsion was dried, as in Example 1. The dried polymer produced was dissolved in water to form a solution of 0.5% by weight of polymer. The results are tabulated in Table II.

In all cases, it was found that the presence of the base significantly increased the solubility rate of the dried polymer. It was also found, in treating samples 6–10, that addition of base directly to the water-in-oil emulsion prior to contacting it with the surfactant resulted in similar enhancement of the solubility of the dried polymer.

TABLE II

| | Enhancement of Solubility | | |
|---|---|---|---|
| Sample | Triton CF-76 Surfactant* (Percentage by weight based on water-in-oil emulsion**) | 50% NaOH*** (Percentage by weight based on water-in-oil emulsion) | Increased Rate of Solubility |
| 1 | 4% | 4% ⎫ added to surfactant solution prior to treating water-in-oil emulsion | Yes |
| 2 | " | 2% | " |
| 3 | " | 1% | " |
| 4 | " | ½% | " |
| 5 | " | ¼% ⎭ | " |
| 6 | 4% | 2% ⎫ added to water-in-oil emulsion prior to treatment with surfactant solution | Yes |
| 7 | " | 1% | " |
| 8 | " | ½% | " |
| 9 | " | ¼% | " |
| 10 | " | ⅛% ⎭ | " |

*ethoxylated nonyl phenol
**emulsion composed of about 30% acrylamide polymer, 30% Isopar M and 40% water
***50% by weight aqueous solution

I claim:

1. An improved method of preparing substantially dry, dust-free, readily soluble polymers and copolymers of water-soluble ethylenic-unsaturated monomers comprising the steps of:

A. preparing a water-in-oil emulsion which employs an alkaline sensitive emulsifying agent and which contains dispersed therein a finely-divided water-soluble vinyl addition polymer;

B. preparing a water mixture which contains dispersed therein from 0.1 to 10% by weight based on polymer of a water-soluble surfactant;

C. contacting the emulsion of Step (A) for about 0.5 to 10 seconds with a sufficient volume of the water mixture of Step (B) to reduce the solids level of the emulsion to 15 to 25% by weight to produce a partially inverted emulsion;

D. casting the partially inverted emulsion of Step (C) upon a surface to form a thin film;

E. heating the film of the partially inverted emulsion to provide a dry film polymer product; and, F. recovering the dry film product;

wherein the improvement comprises the step of hydrolyzing the alkaline sensitive emulsifying agent by adjusting the pH of the partially inverted emulsion of Step (C) to at least 11.5 with a water-soluble base prior to forming a thin film of Step (D).

2. The method of claim 1 wherein the pH of the partially inverted emulsion of Step (B) is adjusted to at least 13.

3. The method of claim 2 wherein the water-soluble base is an alkali metal hydroxide.

4. The method of claim 2 wherein the water-soluble base is sodium hydroxide.

5. The method of claim 1 wherein the water-soluble ethylenic-unsaturated monomer is acrylamide.

* * * * *